United States Patent
Atkins

(10) Patent No.: US 10,373,585 B2
(45) Date of Patent: Aug. 6, 2019

(54) METAMERICALLY STABLE RGBW DISPLAY

(71) Applicant: Dolby Laboratories Licensing Corporation, San Francisco, CA (US)

(72) Inventor: Robin Atkins, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 12 days.

(21) Appl. No.: 15/704,708

(22) Filed: Sep. 14, 2017

(65) Prior Publication Data

US 2018/0082658 A1 Mar. 22, 2018

Related U.S. Application Data

(60) Provisional application No. 62/396,300, filed on Sep. 19, 2016.

(51) Int. Cl.
| | | |
|---|---|---|
| G09G 3/20 | (2006.01) | |
| G09G 5/02 | (2006.01) | |
| H04N 1/60 | (2006.01) | |

(52) U.S. Cl.
CPC ............ *G09G 5/02* (2013.01); *G09G 3/2003* (2013.01); *H04N 1/6022* (2013.01); *G09G 2300/0452* (2013.01); *G09G 2320/0271* (2013.01); *G09G 2320/0666* (2013.01); *G09G 2340/06* (2013.01)

(58) Field of Classification Search
CPC ........................................................ G09G 5/02
USPC ........................................................ 345/589
See application file for complete search history.

(56) References Cited

U.S. PATENT DOCUMENTS

| | | |
|---|---|---|
| 8,004,545 B2 | 8/2011 | Inuzuka |
| 8,681,401 B2 | 3/2014 | Edge |
| 8,941,678 B2 | 1/2015 | Kurtz |
| 9,049,410 B2 | 6/2015 | Botzas |
| 9,134,178 B2 | 9/2015 | Kurtz |
| 9,140,607 B2 | 9/2015 | Maier |
| 2004/0222999 A1 | 11/2004 | Choi |
| 2009/0201309 A1* | 8/2009 | Demos ................. G01J 3/02 345/589 |
| 2011/0273495 A1 | 11/2011 | Ward |
| 2013/0027567 A1* | 1/2013 | Sarkar ................. G01J 3/46 348/189 |
| 2013/0222414 A1 | 8/2013 | Ito |
| 2014/0225912 A1 | 8/2014 | Govil |

OTHER PUBLICATIONS

Spindler J. et al., "System considerations for RGBW OLED displays", Journal of the SID 14/1, pp. 37-48, 2006.

(Continued)

*Primary Examiner* — Shivang I Patel

(57) ABSTRACT

Methods for designing metamerically stable RGBW displays are presented. Display parameters are selected so that given a reference spectral power distribution (SPD) for the white color primary (e.g., one based on D65), and a test spectral power distribution for the white color primary, deviations in color appearance measurements between the two SPDs among N different observers are minimized. Given a display with a metamerically stable white (W), given linear input R, G, and B values, output R, G, B, and W values are generated to optimize metameric stability instead of reducing power consumption or to increase total brightness.

14 Claims, 3 Drawing Sheets

(56) References Cited

OTHER PUBLICATIONS

Kumar S. et al., "Color selection algorithm design for smart lighting application", IRACST—International Journal of Computer Science and Information Technology & Security (IJCSITS), vol. 4, No. 1, pp. 8-13, Feb. 2014.
Giorgianni E.J. et al., "Digital Color Management Encoding solutions", Second Edition, pp. 12-14, 2008.
Sarkar A. et al., "Toward reducing observer metamerism in industrial applications: colorimetric observer categories and observer classification", Color and Imaging Conference, vol. 2010, No. 1, pp. 307-313. Society for Imaging Science and Technology, 2010.
Recommendation ITU-R BT.2100-0(Jul. 2016), "Image Parameter Values for High Dynamic Range Television for use in production and international programme exchange", ITU, pp. i-15, Jul. 2016.
Fairchild, M. D. et al "Mean Observer Metamerism and the Selection of Display Primaries" Fifteenth Color Imaging Conference, Nov. 1, 2007.
Ramanath, Rajeev "Minimizing Observer Metamerism in Display Systems" Color Research and Application, John Wiley & Sons, Inc. vol. 34, No. 5, Oct. 1, 2009, pp. 391-398.
Berns, Roy S. "Billmeyer and Saltzmann's Principles of Color Technology, Other Quality Metrics", Mar. 31, 2000, New York, John Wiley & Sons, pp. 126-130.

\* cited by examiner

METAMERICALLY STABLE RGBW DISPLAY

CROSS-REFERENCE TO RELATED APPLICATION

This application claims the benefit of priority from U.S. Provisional Patent Application No. 62/396,300, filed Sep. 19, 2016, which is hereby incorporated by reference in its entirety.

TECHNOLOGY

The present invention relates generally to displays. More particularly, an embodiment of the present invention relates to metamerically stable RGBW displays.

BACKGROUND

Every observer has a slightly different sensitivity to the visible spectrum of light. This means that different observers viewing the same color spectrum may see slightly different colors. This is important in performing the color calibration on a display. During display calibration, the typical process is to measure the characteristics of the display and then adjust it until it conforms to some expected value. The measurement and target value operate under the assumption of a particular viewer, referred to as "a standard observer." If everyone conformed exactly to this standard observer, then everyone would see the same resulting colors. However, this is not the case, so even though the measurement device reports an exact color match, individual observers may not agree. This can be especially noticeable if multiple displays with different spectral distributions are each calibrated using a measurement device with standard observer to be an exact match, but then appear to have different colors to an individual observer. This is called a metameric mismatch or metameric failure. To improve the metameric stability of displays, as appreciated by the inventors here, improved techniques for metamerically stable displays are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
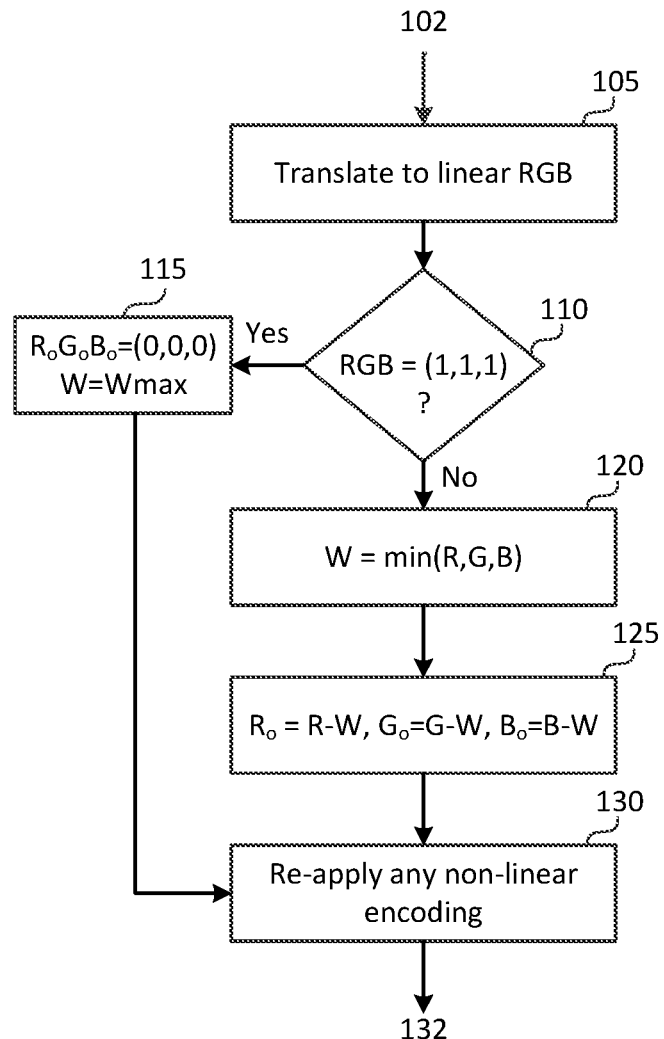
FIG. 1 depicts a first example process for a metamerically stable RGBW display according to an embodiment of the present invention.

Techniques for metamerically stable RGBW displays are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for designing metamerically stable RGBW displays. In an embodiment, given an initial display design, a reference spectral power distribution (SPD) function and a test display SDP function for the white color primary (W) are defined. For N observers, a processor computes reference XYZ values, based on the reference SPD, and test XYZ values, based on the test SPD. The XYZ values are translated into color values in a perceptually uniform color space (such as ICtCp [3]) to generate reference color values and test color values. Difference value based on the reference color values and the test color values are computed. The processor computes a measure of metameric stability for the test display based on the difference values for all the observers (e.g., based on the standard deviation of the difference values). The process may be repeated for multiple display designs, and the design parameters for the final display with a metamerically stable white are selected so that the measure of metameric stability is minimized across all designs.

In an RGBW display with metamerically stable W, in an embodiment, given linear input R, G, B data, if an input pixel value is white, its output RGB sub-pixel values are set to 0 (black), and the W sub-pixel value is set to its maximum allowed value. Otherwise, for each pixel, W=min(R, G, B), and output RGB values are computed by subtracting from each input R, G, or B value the W value.

In another embodiment, in an RGBW display with metamerically stable W, given linear input R, G, B data, if an input pixel value is white, its output RGB sub-pixel value is set to white, and its W sub-pixel value is set to its maximum allowed value. If an input pixel value is mid-gray, its output RGB value is set to 0 (black), and W is set to its maximum allowed value. Otherwise, for each pixel: (a) input RGB values are scaled by a scaler s (e.g., s=2) to generate RsGsBs values, (b) a first W value is computed as min(Rs, Gs, Bs), (c) the output W is computed as the minimum of the first W and its maximum allowed value, (d) first output RGB values are computed by subtracting from each RsGsBs value the W value, and (e) the final output RGB values are computed by clamping the first output RGB values between 0 and their maximum allowed value.

Metamerically Stable RGBW Displays

In general, there is a tradeoff between color gamut and metameric stability. It is only possible to achieve a very wide color gamut by using very narrow band light sources, such as lasers being used in high-end, high-dynamic range (HDR), video or digital cinema projectors. However, this same narrow band light source tends to cause the greatest difference between individual observers. On the other hand, a very wide band light source, such as daylight, has the greatest metameric stability between observers; however, for color-critical applications, such as movies, it is desirable to have both a wide color gamut (a greater palette for creative color choices) as well as a high degree of metameric stability (so that multiple people working on the same movie are all seeing the same color). Other applications where metameric stability is important include industrial design, fashion, marketing and graphics, and photography.

In an embodiment, metameric stability is achieved by employing a four-pixel RGBW display. In a typical RGB display, all colors, including white, are produced using three sub-pixels, one for the red (R) color, one for the green (G) color, and one for the blue color (B). An RGBW display employs an additional white-only (W) sub-pixel. In existing on the market RGBW displays, the W primary is typically used to either increase brightness or, for the same brightness, to lower power consumption. In contrast, in this invention, the W primary is adjusted to improve metameric stability.

When displaying near-white imagery, light is produced primarily by the white subpixel, resulting in very good metameric stability, meaning that all observers will perceive the same color. For wider, more saturated colors, the white pixel is used less and less to achieve the saturated color, and the metameric stability will decrease. However since human vision is most sensitive to color differences near white, this is an acceptable tradeoff to achieve both wide gamut and metameric stability.

As in existing RGBW displays, in an embodiment, the RGB pixel structure is replaced with an RGBW pixel structure. Since there are now only ¾ as many RGB sub-pixels, the maximum luminance of a saturated color is reduced to 75%. The white sub-pixel however can achieve a higher luminance due to higher transmission efficiency, so the peak white is increased to 150%. The shape of the resulting color volume is different from a traditional RGB display, but within the color volume the color accuracy is not compromised in any way, and the metameric stability of the color increased towards neutral (white). For example, such a methodology, without limitations, may apply to displays with the following characteristics:

White LED backlight plus RGBW LCD panel
RGBW LED backlight plus RGBW LCD panel
White OLED plus RGBW color filters
White plus RGB OLEDs without any color filters
White light source plus RGBW color wheel (e.g., in a projector)
White light source plus RGBW bandpass filters splitting into four light paths (e.g., in a projector)
RGBW light sources split into four light paths (e.g., in a projector)
Any combination of the above FIG. 1 depicts an example process for a metamerically stable RGBW display according to an embodiment where the white (W) color primary in the display has been designed for metameric stability. An example process for designing a display with metamerically stable W will be presented later on (e.g., see FIG. 3). Without limitation, input RGB signals are considered to be normalized between 0 and 1. Given an input RGB signal (102), step (105), if needed, removes any signal non-linearity, such as the one that may be described by the signal's electro-optical transfer function (EOTF), such as SMPTE ST. 2084, BT. 1886, and the like. If pixel values in the input signal are white (e.g., R=G=B=1) (110), then, from step (115), W=Wmax, where Wmax denotes the maximum possible value for the W sub-pixel (e.g., Wmax=1), and the output RGB sub-pixel pixel values are set to black (e.g., $R_o=B_o=G_o=0$). Otherwise, from steps (120) and (125), $$W=\min(R,G,B),$$

and $$R_o=R-W, G_o=G-W, B_o=B-W. \qquad (1)$$

If needed, in step (130), the input non-linear encoding or any other non-linear encoding may be reapplied to the output $R_o G_o B_o W$ signal (132) to drive the RGBW display. Note that if Wmax=1, then step (115) is redundant.

Figure 2:
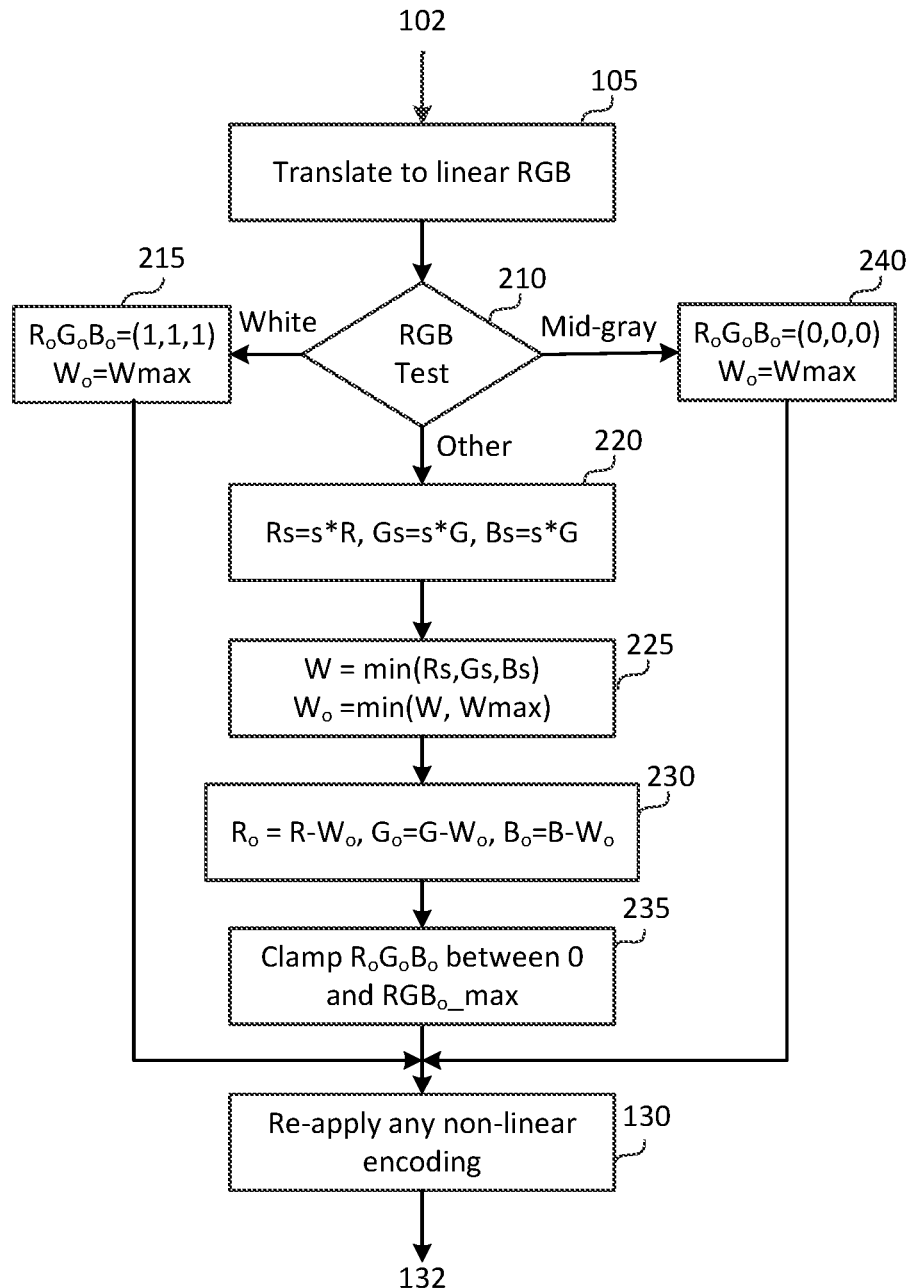
FIG. 2 depicts a second example process for a metamerically stable RGBW display according to an embodiment of this invention.

The algorithm above has the same color gamut volume and maximum luminance as can be achieved by the RGB sub-pixels alone; however, as mentioned previously, it is also possible to extend the luminance of near-neutral colors by modifying the algorithm slightly. This will increase the maximum luminance of the display, but since part of the maximum luminance will be produced by the narrow-band RGB sub-pixels, the peak white will be less metamerically stable than the algorithm above. However, mid-greys will still have high metameric stability since they can be achieved by the W subpixel alone. FIG. 2 depicts such an example process according to an embodiment.

As in FIG. 1, given an input RGB signal (102), step (105), if needed, removes any non-linearity, such as described by the signal's electro-optical transfer function (EOTF), such as SMPTE ST. 2084, BT. 1886, and the like. Step (210) tests whether the input signal is white or mid-gray. If the signal is white (e.g., R=G=B=1), then, from step (215), $W_o$=Wmax, and $R_o=B_o=G_o$=RGB$_o$_max, where RGB$_o$_max denotes the maximum allowed output RGB value (e.g., RGB$_o$_max=1). This output provides the highest brightness, but has low metameric stability. If the signal is mid-gray (e.g., R=G=B=0.5), then, from step (240), $W_o$=Wmax and $R_o=B_o=G_o=0$. This output provides lower brightness than in (215), but has higher metameric stability.

If the input is not white or mid-gray, then, in step (220), the input RGB values are scaled by a scaler s (e.g., s=2) to generate scaled RGB values:

$$Rs=R*s; Gs=G*s, Bs=B*s. \qquad (2a)$$

Then, from steps (225), (230), and (235), $$W=\min(Rs,Gs,Bs),$$

$$W_o=\min(W,W\max),$$

$$R_o=Rs-W_o; G_o=Gs-W_o; B_o=Bs-W_o,$$

$$R_o=\text{Clip3}(0, R_o\_\max, R_0),$$

$$G_o=\text{Clip3}(0, G_o\_\max, G_0),$$

$$B_o=\text{Clip3}(0, B_o\_\max, B_0), \qquad (2b)$$

where the Clip3(0, RGB$_o$_max, x) function clamps the input x between the values 0 and the maximum supported or allowed output value (RGB$_o$_max); that is, if x<0, then x=0; and if x>RGB$_o$_max, then x=RGB$_o$_max. If needed, in step (132), the input non-linear encoding or any other non-linear encoding may be reapplied to the $R_o G_o B_o W_o$ signal (132) to drive the RGBW display.

A person of ordinary skilled in the art will appreciate that while equations (1)-(2) are given in the RGB domain, equivalent computations may be computed in any other color space of interest, such as YCbCr, YUV, and the like.

Design Optimization for Metamerically Stable while Color Primary

In current design methodologies, the design of the spectral power distribution (SPD) for RGB primaries is optimized for maximum color gamut and power efficiency. Typically LED, OLED, and lasers sources have very narrow-band spectral emissions, so they are good choices. Alternatively, broadband white light can be created and then filtered to produce a saturated color, although typically with lower efficiency. In an embodiment, the spectral power distribution of the W primary is optimized for metameric stability rather than power efficiency.

Given a reference spectrum, one can measure metameric stability by how much the color appearance would deviate among different observers. For example, as a reference white color one may use the CIE daylight definition (D65), which is defined as the SPD measured from a cloudy sky. This is a reasonable reference, because it is common across the world and naturally occurring. However other reference spectra are also possible, for example a specific display technology such as Xenon, CRT phosphor, or LED. The metameric stability would then measure the difference to that alternate reference spectra.

Figure 3:
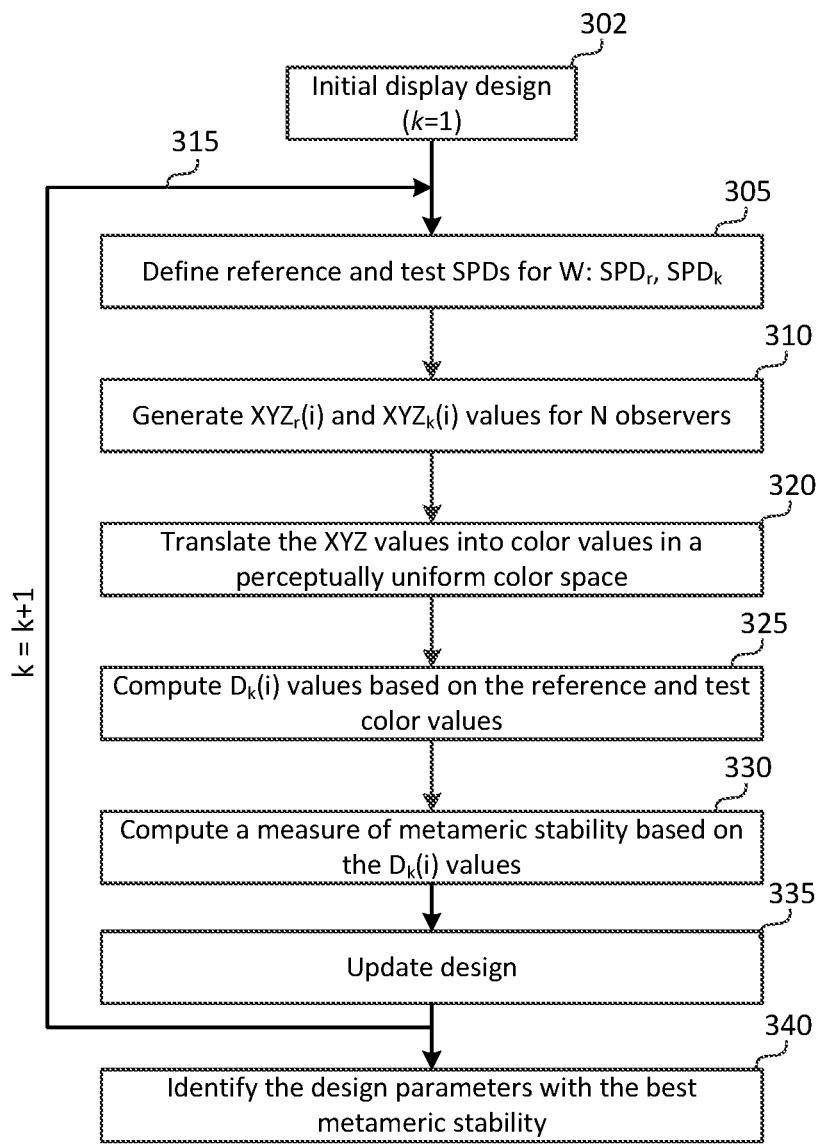
FIG. 3 depicts an example process for optimizing a display design to increase metameric stability using spectral power distribution optimization according to an embodiment of this invention.

FIG. 3 depicts an example process for optimizing a display design for metameric stability in the white color primary (W). Given an initial set (e.g., k=1) of design parameters defining an initial display design (302), where k=1, 2, . . . , P, characterizes the k-th set of parameters for designing the display, such as a combination of light emitters, phosphors, quantum dots, filters, and the like, in step (305), one may determine SPDs for the display under testing (denoted as $SPD_k$) and the reference spectral power distribution (denoted as $SPD_r$). Given these SPDs and a group of N observers, in step (310), one computes their corresponding XYZ values ($XYZ_k(i)$ and $XYZ_r(i)$) for the i-th observer (i=1, 2, . . . , N), by integrating each SPD with corresponding color matching functions. For example, from [1], $$X = g\Sigma_\lambda S(\lambda)\bar{x}(\lambda),$$

$$Y = g\Sigma_\lambda S(\lambda)\bar{y}(\lambda),$$

$$Z = g\Sigma_\lambda S(\lambda)\bar{z}(\lambda), \quad (3)$$

where $S(\lambda)$ denotes the SPD of a light source, $\bar{x}(\lambda)$, $\bar{y}(\lambda)$, and $\bar{z}(\lambda)$ denote the color matching functions for the i-th observer, and g denotes a normalizing scaler.

In [2], Sarkar et al., propose using eight types of statistically different classes of observers; however, results from some classes of observers may be more weighted than other classes depending on the target market of the display or by the distribution of these classes in the population.

In step (320), the computed $XYZ_k$ and $XYZ_r$ values may be translated to a perceptually uniform color space (e.g., $ICtCp_k(i)$ and $ICtCp_r(i)$ [3]) so that their differences ($D_k(i)$) are weighted evenly. For example, in step (325), in an embodiment, $D_k(i)$ may be computed as a function of the ICtCp values:

$$D_k(i) = \sqrt{D_I^2(i) + D_{Ct}^2(i) + D_{Cp}^2(i)}, \, i=1,2,\ldots,N, \quad (4)$$

where, given the ICtCp values for the reference SPD (e.g., $l_r(i)$, $Ct_r(i)$, and $Cp_r(i)$) and the test SPD (e.g., $l_k(i)$, $Ct_k(i)$, and $Cp_k(i)$)

$$D_I(i) = l_r(i) - l_k(i),$$

$$D_{Ct}(i) = Ct_r(i) - Ct_k(i),$$

$$D_{Cp}(i) = Cp_r(i) - Cp_k(i). \quad (5)$$

Given $D_k(i)$ values for i=1, 2, . . . , N, in step (330), one can compute the variance or standard deviation of $D_k(i)$, (e.g., $\sigma_k$), across all observers. For example $$\sigma_k^2 = \frac{1}{N}\sum_{i=1}^{N}(D_k(i) - \mu)^2, \quad (6)$$

where $$\mu = \frac{1}{N}\sum_{i=1}^{N} D_k(i). \quad (7)$$

In an embodiment, the $ICtCp_r(i)$ values may be computed only once, (e.g., for k=1) and thus be reused across multiple iterations (315) of $SPD_k$ functions.

The output of (330) (e.g., $\sigma_k$) is a measure of the metameric stability of the W sub-pixel, and the goal of this process is to minimize this value across all the P designs under consideration. Obviously, this can be achieved by producing the exact same SPD as the reference SPD (e.g., D65), in which case the standard deviation will be zero; however for some display technologies it may not be feasible or economical to produce the exact D65 spectrum, but instead approximate it using combinations of light emitters, phosphors/quantum dots, and filters, as characterized by the k-th set of design parameters.

After steps (305) to (335) are repeated for multiple design alternatives, in step (340), one can identify the design with the best metric of metameric stability and weight this against other design considerations.

Given a display design optimized for metameric stability in the white primary, given a set of input RGB values, one may then adjust the output RGB values as described earlier (e.g., see FIG. 1 and FIG. 2).

REFERENCES

[1] E. J. Giorgianni and T. E. Madden, "*Digital color management*, Encoding solutions," Second Edition, pp. 12-14, Wiley, 2008.
[2] Sarkar, Abhijit, Laurent Blonde, Patrick Le Callet, Florent Autrusseau, Patrick Morvan, and Jürgen Stauder. "*Toward reducing observer metamerism in industrial applications: colorimetric observer categories and observer classification.*" In Color and Imaging Conference, vol. 2010, no. 1, pp. 307-313. Society for Imaging Science and Technology, 2010.
[3] Recommendation ITU-R BT.2100-0 (July 2016), "*Image parameter values for high dynamic range television for use in production and international programme exchange,*" ITU, July, 2016.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to metamerically stable RGBW displays, such as those described herein. The computer and/or IC may compute any of a variety of parameters or values that relate to metamerically stable RGBW displays described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to metamerically stable RGBW displays as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to metamerically stable RGBW displays are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method to design a metamerically stable RGBW display, the method comprising:
accessing a reference spectral power distribution (SPD) function for a white color primary;
accessing a first test SPD function for the white color primary for a display based on a first set of display parameters;
computing reference XYZ values based on the reference SPD and color matching functions for N observers;
computing first test XYZ values based on the test SPD and the color matching functions for the N observers;
translating the reference XYZ values and the first test XYZ values into color values in a perceptually uniform color space to generate reference color values and first test color values, wherein the perceptually uniform color space comprises the ICtCp color space;
computing first difference values based on the reference color values and the first test color values; and
computing a first measure of metameric stability based on the first difference values.

2. The method of claim 1, further comprising:
determining a second test SPD function for the white color primary for the display based on a second set of display parameters;
computing second test XYZ values based on the second test SPD and the color matching functions for the N observers;
translating the second test XYZ values into color values in the perceptually uniform color space to generate second test color values;
computing second difference values based on the reference color values and the second test color values;
computing a second measure of metameric stability based on the second difference values; and
if the first measure of metameric stability is smaller than the second measure of metameric stability selecting the first set of design parameters for the display, otherwise selecting the second set of design parameters.

3. A method for a metamerically stable RGBW display, the method comprising:
determining, according to claim 2, design para meters for a display with a metamerically stable white color primary (W);
receiving in the display an input image comprising pixels, wherein each pixel comprises three input color components R, G, and B; for a pixel in the input image:
adjusting the output W value as the minimum of the input R, G, and B values; and setting:

output $R$=input $R$−output $W$;

output $G$=input $G$−output $W$;

output $B$=input $B$−output $W$.

4. The method of claim 3, further comprising removing any non-linearity from the input image before computing the output RGBW values.

5. The method of claim 3, further comprising re-applying a non-linearity to the output RGBW signal values.

6. The method of claim 3, wherein input RGB values and output RGB and W values are normalized to be between 0 and 1.

7. A method for a metamerically stable RGBW display, the method comprising:
determining, according to claim 2, design parameters for a display with a metamerically stable white color primary (W);
receiving in the display an input image comprising pixels, wherein each pixel comprises three input color components R, G, and B, wherein each of the components comprises values between 0 and RGB_in_max;
for a pixel in the input image:
if the pixel color is white, then setting:

output $R$=output $G$=output $B$=$RGB\_out\_max$;

output $W$=$W$max, wherein RGB_out_max denotes a maximum value for the output RGB values and Wmax denotes a maximum allowed value of W;

if the pixel color is mid gray, then setting output $R$=output $G$=output $B$=0;

output $W$=$W$max;

else, multiplying each input RGB component by a scaler to generate scaled input R, G, and B values;

computing a first output W value as the minimum of the scaled input R, G, and B values;

computing output W=min(first output W, Wmax);

computing output $R$=scaled input $R$−output $W$;

output $G$=scaled input $G$−output $W$;

output $B$=scaled input $B$−output $W$; and clamping each of the output R, G, and B values between 0 and RGB_out_max.

8. The method of claim 7, wherein a pixel is determined to be white if for that pixel input R=input G=input B=RGB_in_max, and a pixel is determined to be mid-gray if for that pixel input R=input G=input B=RGB_in_max/2.

9. The method of claim 1, wherein the design parameters comprise one or more combinations of light emitters, phosphors, quantum dots, and display filters.

10. The method of claim 1, wherein the measure of metameric stability comprises the standard deviation of the difference values across all N observers.

11. The method of claim 1, wherein the square of the difference value for an observer comprises the sum of the squares of the color differences between the reference color values and the test color values for the observer.

12. The method of claim 1, wherein the reference SPD function for the white color primary comprises the CIE daylight, D65, definition.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *